May 10, 1938.  R. C. CHARLTON  2,117,147
INSERTED TOOTH SAW BLADE
Filed Feb. 21, 1936

Inventor:
Richard C. Charlton
by his Attorneys
Howson & Howson

Patented May 10, 1938

2,117,147

UNITED STATES PATENT OFFICE 2,117,147

INSERTED TOOTH SAW BLADE

Richard C. Charlton, Philadelphia, Pa., assignor to Henry Disston & Sons, Incorporated, Tacony, Pa., a corporation of Pennsylvania Application February 21, 1936, Serial No. 65,142

1 Claim. (Cl. 143—145)

This invention relates to improvements in saw blades of the inserted tooth type, and the multiple object of the invention is to provide means for facilitating the insertion and removal of the teeth; for insuring accurately aligned seating of the teeth in the blade proper; for preventing abrasion and damage to the blade and teeth in the processes of insertion and removal, thereby insuring long and efficient service; and for more securely and positively anchoring the teeth in the blade against accidental displacement.

Figure 1:
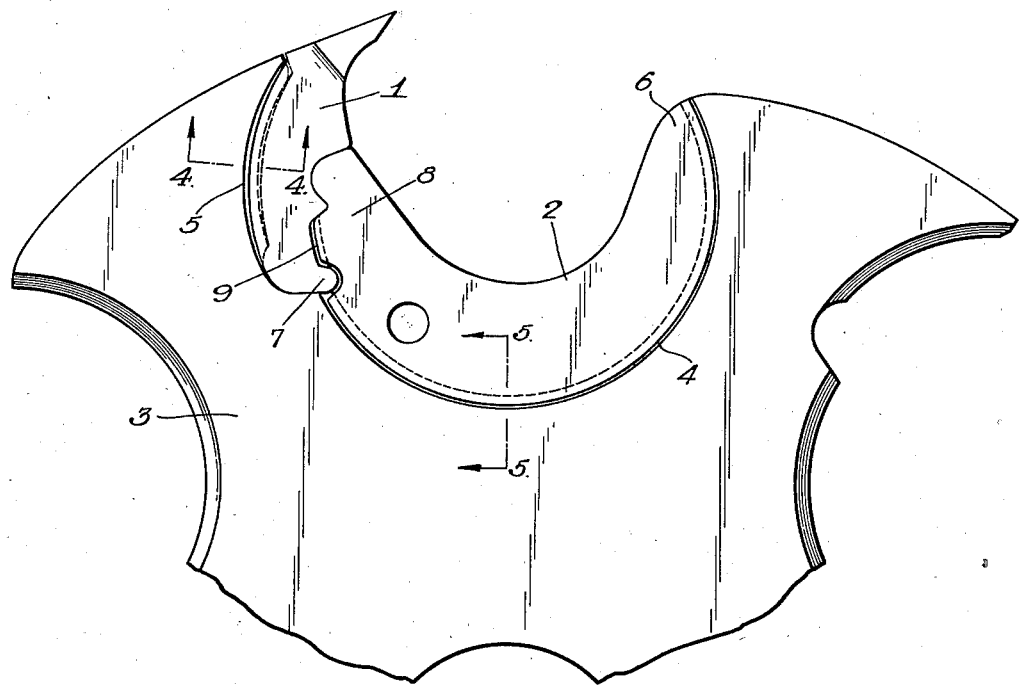
Figure 2:
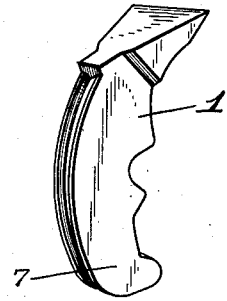
Figure 3:
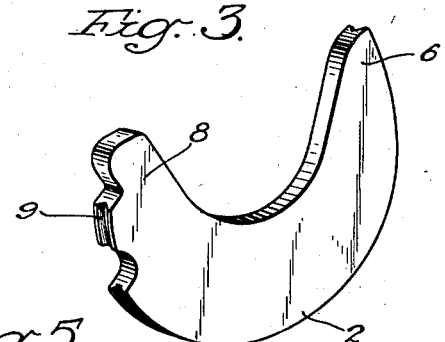

Figure 1 of the attached drawing shows a fragment of a circular saw blade of the type to which my invention relates;

Figs. 2 and 3 are views in perspective of the respective insert elements, and

Figure 4:
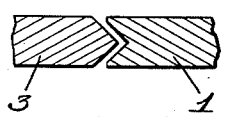
Figure 5:
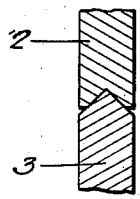

Figs. 4 and 5 are, respectively, sections on the lines 2—2 and 3—3 of Fig. 1.

In saws of the type illustrated, the inserted tooth elements, each consisting in the present intance of two parts 1 and 2 of which the part 1 constitutes the cutting tooth proper and part 2 the locking element, are anchored in the body 3 of the blade primarily by friction between the contacting surfaces augmented by a relative tensioning of the parts which increases the pressure with which said surfaces bear against each other. In the present instance, this tensioning falls in large part upon the element 2 which functions to lock the cutting element 1 in position and causes both elements to bear heavily upon their respective seats 4 and 5 in the blade body. It will be understood that in some cases the elements 1 and 2 may be formed as one and that the invention applies also to that type of construction.

Seating of the tooth elements in the blade body is accomplished by inserting the tail end 6 of the element 2 in the blade recess with its recessed seating edge in mating relation with the reversely formed edge 4 of the blade body, the element then being advanced longitudinally toward the fully assembled position in which it is shown in Fig. 1. When sufficiently far advanced, the butt end 7 of the element 1 is mated with the head end 8 of the element 2 so that the further advance of the latter element on its seat draws the element 1 into the position shown in Fig. 1, in which it is locked by the element 2. As shown in Fig. 2, the edge of the element 1 which seats upon the body 3 of the blade is recessed similarly to the element 2 and interlocks transversely with the reversely formed edge of the blade body, and a similar transverse interlock is provided at 9 between the elements 1 and 2. As the locking element 2 is advanced toward its final position, it is subjected to increasing tension by compression between the blade body and the element 1.

In practice, this inserting operation even with the aid of special tools and suitable lubricants has been a difficult one. It has required the application of considerable force, and not infrequently is accompanied by scoring and mutilation of the seating surfaces. There was also frequent difficulty in obtaining accurate seating and alignment of the inserted teeth due to their tendency to cock under the relatively great forces required to move them into position. Furthermore, the use of a lubricant as such is undesirable, since while aiding the operation, its presence in the assembly reduces the frictional resistance to accidental displacement of the teeth. It is apparent that all of these disadvantages increase in degree with the degree of tension under which the inserts are placed, so that this tension factor upon which in large degree depends the security of the inserts in the blade body was necessarily limited in amount to that affording a reasonable ease and accuracy of assembly.

My invention resides in the discovery that all of these recognized faults of this type of blade can be effectively overcome by the simple expedient of providing the inserted element or elements with a thin coating of metallic cadmium, such coating being readily and inexpensively applied by the known plating processes. This coating which adheres closely and is not readily destroyed has the faculty not only of causing the insert to slide smoothly and easily into place but also, and unlike the conventional lubricant, aids in retaining the insert when fully inserted in position. This latter characteristic is of importance in that it avoids the chief objection to the use of conventional lubricants which, as previously set forth, while to some extent facilitating insertion, also renders the inserted element relatively insecure when in position.

In addition to this peculiar and valuable characteristic, the cadmium coating is considerably more efficient than a conventional lubricant in facilitating the entrance of the insert. This relative ease of insertion not only avoids the necessity for the conventional lubricant, but also precludes mutilation of the seats and the prior difficulty of obtaining accurate alignment of the inserts in the blade body. Of equal importance is the fact that it is practicable, by reason of the facility of insertion conferred by the cadmium coating, to materially increase the tension under which the insert is placed in assembly over and above that which previously has been found possible by reason of the limitations referred to, and by so doing to correspondingly further increase the security with which the insert is held in position in the blade body. This increased security is obtained without complicating the insertion operation.

While it is possible to obtain the aforedescribed benefits of my invention by applying the cadmium to the seating portions only of the insert elements, I prefer to extend the coating to all surfaces both as a matter of convenience and to take advantage of the rust-preventing properties of the cadmium. Obviously, the advantages of the invention could in some degree be obtained by coating the seat surfaces of the blade body instead of the inserts; or the seats of both insert and body members may be coated. I am aware that the lubricating characteristics of cadmium have been suggested for purposes other than the present, but what I claim as my invention is the discovery of the special benefits beyond simple lubrication arising from the application of cadmium specifically to saws of the type set forth and of the substantial improvement in the characteristics of this type of saw to be effected by such application.

I claim:

A cutting tool of the inserted tooth type comprising in combination a metallic blade body having in an edge thereof a re-entrant arcuate tooth-receiving socket, a tooth seating at one side of said socket, and a segmental locking element also seating in said socket and interlocking with said tooth, said locking element being forcibly inserted with the tooth by longitudinal sliding movement on the curved surface of the socket and during said insertion being placed under tension between the one end of the socket and the tooth at the opposite end, said element being thereby operative to rigidly retain the tooth in position, and said tool being provided with a coating of metallic cadmium forming a film of that metal between the contacting surfaces of the blade body and one or both of the inserted elements.

RICHARD C. CHARLTON.